(12) United States Patent
Kitamura et al.

(10) Patent No.: US 7,459,857 B2
(45) Date of Patent: Dec. 2, 2008

(54) BICYCLE LIGHTING SYSTEM

(75) Inventors: Satoshi Kitamura, Sakai (JP); Masayoshi Nagae, Sakai (JP)

(73) Assignee: Shimano Inc., Osaka (JP)

( * ) Notice: Subject to any disclaimer, the term of this patent is extended or adjusted under 35 U.S.C. 154(b) by 10 days.

(21) Appl. No.: 11/646,454

(22) Filed: Dec. 28, 2006

(65) Prior Publication Data
US 2007/0252537 A1   Nov. 1, 2007

(30) Foreign Application Priority Data
Apr. 28, 2006   (JP) ............... 2006-126227

(51) Int. Cl.
*B60Q 1/26* (2006.01)
(52) U.S. Cl. .......... 315/78; 315/129; 315/200 R; 362/473; 362/543; 362/545; 362/192; 322/13
(58) Field of Classification Search ........ 315/76, 315/77, 78, 129, 130, 200 R, 201; 362/473, 362/475, 183, 192, 227, 464, 545, 543; 340/815.45, 340/815.52; 322/7, 13
See application file for complete search history.

(56) References Cited

U.S. PATENT DOCUMENTS

| | | | | |
|---|---|---|---|---|
| 5,247,430 A | * | 9/1993 | Schwaller | 362/473 |
| 7,119,707 B2 | * | 10/2006 | Uno | 340/815.45 |
| 7,292,006 B2 | * | 11/2007 | Horiuchi | 322/7 |
| 2004/0108683 A1 | * | 6/2004 | Oohara | 280/288.4 |
| 2005/0243545 A1 | | 11/2005 | Watanabe | 362/192 |

FOREIGN PATENT DOCUMENTS

| | | | |
|---|---|---|---|
| DE | 4324779 A1 | * | 3/1994 |
| DE | 4420589 A1 | * | 3/1995 |
| JP | 2003-11879 | | 1/2003 |
| WO | WO-02/36420 A1 | | 5/2002 |

* cited by examiner

*Primary Examiner*—Haissa Philogene
(74) *Attorney, Agent, or Firm*—Global IP Counselors, LLP

(57) ABSTRACT

The bicycle lighting system includes a primary lighting circuit and at least one electrically operated component connected in parallel to a rectifying circuit that receives electricity from a hub dynamo. The electrically operated component can be a supplemental lighting circuit, an electric transmission component and/or a tail lamp. The lighting system includes a rectifying circuit configured and arranged to rectify electricity generated by a hub dynamo. The primary lighting circuit has at least one first light emitting diode that is configured and arranged to always receive electricity outputted from the rectifying circuit.

14 Claims, 3 Drawing Sheets

BICYCLE LIGHTING SYSTEM

CROSS-REFERENCE TO RELATED APPLICATIONS

This application claims priority under 35 U.S.C. § 119 to Japanese Patent Application No. 2006-126227 filed on Apr. 18, 2006. The entire disclosure of Japanese Patent Application No. 2006-126227 is hereby incorporated herein by reference.

BACKGROUND OF THE INVENTION

1. Field of the Invention

This invention generally relates to a bicycle lighting system. More specifically, the present invention relates to a bicycle lighting system that uses electricity generated by a bicycle dynamo.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. Moreover, the bicycle industry is constantly improving the bicycle in general to be more versatile in different riding situations as well as to be more user friendly.

Bicycles have been provided with electrical devices such as a front lamp and/or tail lamp attached as lighting apparatuses. Conventionally, most front lamps are lit by electricity from a dynamo. Generally, the output voltage from a dynamo increases proportionally to the bicycle's speed (wheel rotation speed). In some cases, at high speed, output voltage between the dynamo terminals exceeds 100 V with the lighting apparatus switched off. Consequently, an electrical device with specifications to withstand such a high voltage is necessary to turn on the lighting apparatus with output voltage from the dynamo. However, parts that withstand high voltage are lacking in general versatility and are expensive.

Recently, electrical devices such as electric transmission systems and components have been attached to bicycles, and some are known to use electricity from a dynamo as an electric source for the electrical device. To use electricity from a dynamo, an electrical device such as this must also withstand high voltage.

Furthermore, to operate each electrical device, in the case of an electric transmission system, for example, most electricity is used or needed at the moment of a change in speed (gear). However, electricity generated by the dynamo at that moment may be insufficient to operate one or more devices, and thus, operation of the electric transmission system sometimes becomes unstable. Therefore, in order to stabilize operation, some electrical devices are provided with a storage element as an electrical device for storing electricity from the dynamo for future use.

For example, to be able to use each electrical device while the bicycle is stopped, some have been provided with a storage element as an electrical device for storing electricity from a dynamo such as disclosed in Japanese Unexamined Patent Application Publication H2003-11879.

In accordance with the above conventional configurations, to be able to use a general-purpose electrical device, each electrical device requires an apparatus for controlling voltage such as a protection circuit to restrict output voltage from the dynamo to a certain range or a voltage-adjusting circuit to adjust voltage to a certain value. Moreover, to use a storage element, it is necessary to control the voltage applied to the storage element so as to protect the storage element.

In view of the above, it will be apparent to those skilled in the art from this disclosure that there exists a need for an improved bicycle lighting system. This invention addresses this need in the art as well as other needs, which will become apparent to those skilled in the art from this disclosure.

SUMMARY OF THE INVENTION

One object of the present invention is to provide a simplified apparatus for controlling voltage in a bicycle lighting system that uses a plurality of electrical devices including a front lamp.

The foregoing objects can basically be attained by providing a bicycle lighting system in accordance with a first aspect of the present invention. The bicycle lighting system in accordance with the first aspect of the present invention includes a rectifying circuit, a primary lighting circuit and an electrically operated component. The rectifying circuit is configured and arranged to rectify electricity generated by a bicycle dynamo. The primary lighting circuit is electrically coupled to the rectifying circuit. The primary lighting circuit has at least one first light emitting diode configured and arranged to always receive electricity outputted from the rectifying circuit. The electrically operated component is connected in parallel with the primary lighting circuit to the rectifying circuit to be operated by electricity from the rectifying circuit. The rectifying circuit is provided in order to rectify AC electricity generated by a bicycle dynamo to direct current (DC).

In accordance with this lighting system of the first aspect of the present invention, when the bicycle moves so that the dynamo generates electricity, the electricity is rectified in the rectifying circuit and supplied to the first light emitting diode in the lighting circuit, which functions as a front lamp, for example. Since the first light emitting diode does not turn on until voltage increases to the forward voltage, when voltage increases to the forward voltage, the first light emitting diode turns on to be lit. When the first light emitting diode is turned on, even if output voltage begins to increase beyond the clamp voltage, which is determined by the forward voltage in the number of diodes through which the current flows within the rectifying circuit and forward voltage in the first light emitting diode, the excessive current flows over via the first light emitting diode, and the output voltage that is clamped to the clamp voltage does not increase over the clamp voltage. Here, because voltage in the overall system is clamped to the first light emitting diode for lighting, it is not necessary to provide a voltage-controlling circuit for each operation. Consequently, in a bicycle lighting system, the apparatus for controlling voltage can be simplified.

In a bicycle lighting system in accordance with a second aspect of the present invention, the electrically operated component is a supplementary lighting circuit including a second light emitting diode that has a forward voltage that is lower than a forward voltage of the first light emitting diode. In other words, the bicycle lighting system preferably includes a supplementary lighting circuit in the system described above, wherein the electrically operated component includes a second light emitting diode for which the forward voltage is lower than that of the first light emitting diode. In this case, if voltage that flows into the second light emitting diode is lowered by resistance, etc., in advance, it is possible to turn on the second light emitting diode that can be used in the supplementary lighting circuit for which light intensity is lower than that of the front lamp, such as for a position light, for example, by clamp voltage through the first light emitting diode.

A bicycle lighting system in accordance with a third aspect of the present invention includes an additional electrically operated component that is an electric transmission component. In other words, the bicycle lighting system preferably includes an electric transmission component in the lighting system, wherein the electrically operated component controls the electric transmission apparatus in the bicycle. In this case, an electric transmission system is provided wherein a storage element such as a capacitor (condenser) is provided, but the output voltage from the dynamo is maintained within the clamp voltage, and thereby, a voltage-controlling circuit does not need to be provided in this transmission controlling system.

A bicycle lighting system in accordance with a fourth aspect of the present invention includes an electric transmission component that includes a storage element configured and arranged to store electricity. In other words, the bicycle lighting system preferably includes an electric transmission system that has a storage element such that the electric transmission system stores rectified electricity. In this case, voltage applied to the storage element can be maintained within a certain range by a simple configuration.

A bicycle lighting system in accordance with a fifth aspect of the present invention includes an additional electrically operated component that is a tail lamp configured to be attached to a rear section of a bicycle, the tail lamp including a third light emitting diode with a forward voltage that is lower than a forward voltage of the first light emitting diode. In other words, the bicycle lighting system preferably includes a tail lamp that is attached to the rear section of the bicycle, with the tail lamp including a third light emitting diode for which the forward voltage is lower than that of the first light emitting diode. In this case, if voltage flowing into the third light emitting diode is lowered by resistance or the like, in advance, it is possible to turn on the third light emitting diode, which can be used for the tail light for which light intensity is lower than that of the front lamp, for example, by clamp voltage through the first light emitting diode.

In the lighting system in accordance with the present invention, because the overall voltage is clamped to the first light emitting diode for lighting, it is not necessary to provide a voltage-controlling circuit for each operation. Consequently, in a bicycle lighting system, the apparatus for controlling voltage can be simplified.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
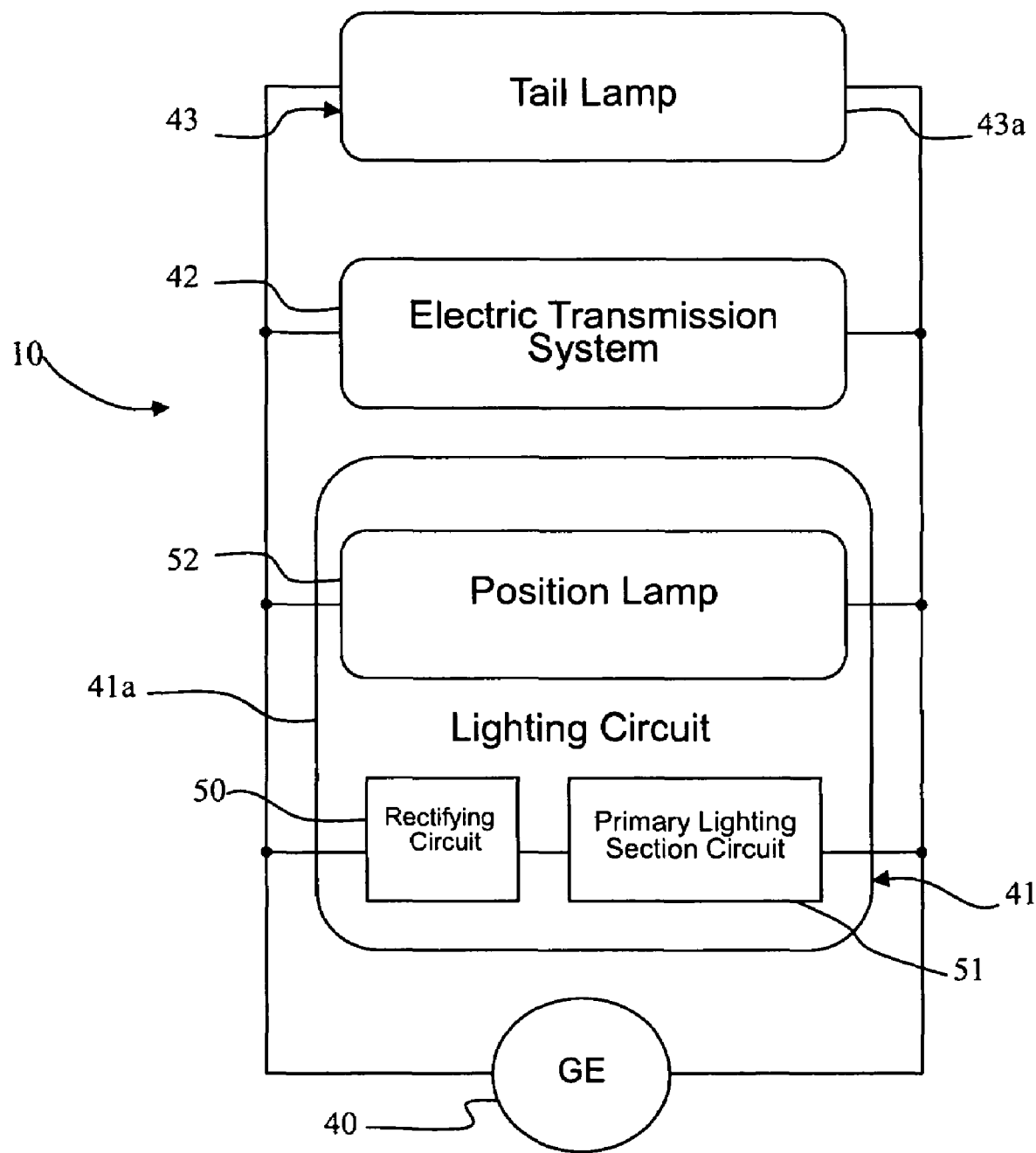
FIG. 1 is a simplified block diagram illustrating the configuration of a bicycle lighting system in accordance with one embodiment of the present invention.

Referring initially to FIG. 1, a bicycle lighting system 10 is illustrated in accordance with a first embodiment of the present invention. The bicycle lighting system 10 illustrated in FIG. 1 basically includes a hub dynamo 40, a lighting circuit 41, an electric transmission component 42 and a tail lamp 43. The hub dynamo 40 is provided on the bicycle hub shaft, for example. The lighting circuit 41 functions as a front lamp. The electric transmission component 42 is connected in parallel relative to the lighting circuit 41 to the hub dynamo 40. The electric transmission component 42 and the tail lamp 43 are electrically operated components. The hub dynamo 40 outputs alternating current (AC) in an amount proportional to the speed of bicycle travel. The hub dynamo 40 supplies electricity to the lighting circuit 41, the electric transmission component 42, and the tail lamp 43 on the bicycle.

The lighting circuit 41 includes a lamp case 41a that is configured and arranged to be secured to a lamp stay provided on the front fork of the bicycle, for example. The lamp case 41a preferably houses a rectifying circuit 50, a primary lighting circuit 51 and a position lamp 52 of the lighting circuit 41. The alternating current (AC) output from the hub dynamo 40 undergoes full-wave rectification in the rectifying circuit 50. The primary lighting circuit 51 includes at least one first light emitting diode LED1 that always receives electricity outputted from the rectifying circuit 50. The first light emitting diode LED1 is arranged to be mounted to the front of a bicycle as a front lamp. The position lamp (one example of a supplementary lighting circuit) 52, is an electrically operated component (i.e. like the electric transmission component 42 and the tail lamp 43). Preferably, the supplemental lighting circuit (position lamp 52), the electric transmission component 42 and tail lamp 43 are all connected in parallel with the primary lighting circuit 51 to the rectifying circuit 50 to be operated by electricity from the hub dynamo 40.

Figure 2:
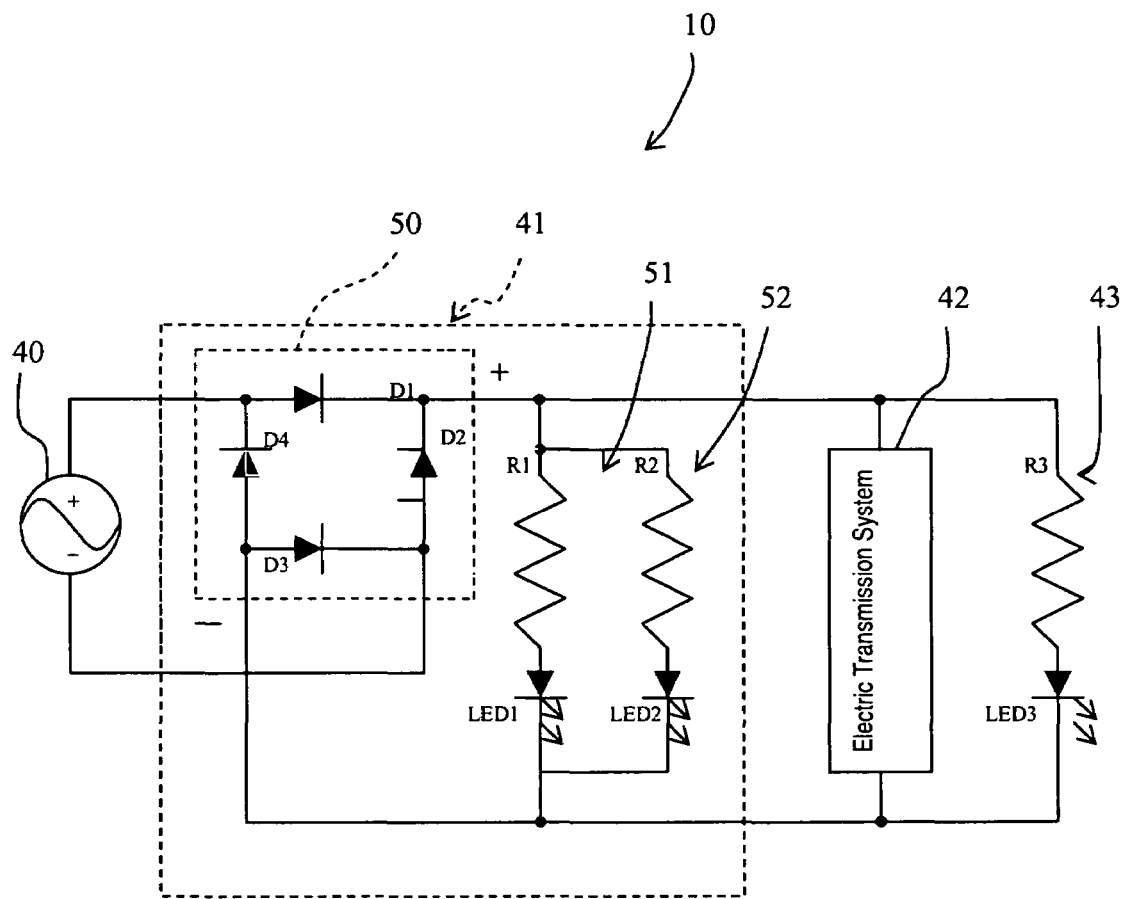
FIG. 2 is a circuit diagram illustrating the configuration of the lighting circuit of the bicycle lighting system illustrated in FIG. 1.

The rectifying circuit 50 includes four diodes D1-D4 that are bridge-connected, having a positive and a negative terminal, as shown in FIG. 2.

The primary lighting circuit 51 includes a resistor (resistance) R1 configured and arranged to adjust voltage and the current. The resistor (resistance) R1 is electrically connected between the positive terminal of the rectifying circuit 50 and the first light emitting diode LED1. The first light emitting diode LED1 is also electrically connected between the resistor (resistance) R1 and the rectifying circuit 50. The first light emitting diode LED1 is a relatively powerful LED for radiating white light output at approximately 3 W, for example, and the forward voltage thereof is 3.5 V, for example. The first light emitting diode LED1 and the rectifying circuit 50 enable output voltage from the hub dynamo 40 to be clamped to a clamp voltage Vc in the lighting system 10. In the clamp voltage Vc at this time, wherein the forward voltage of each diode D1-D4 is Vd, and the forward voltage of the first light emitting diode LED1 is Ved, the clamp voltage Vc is represented as follows:

$$Vc = 2 \times Vd + Ved$$

Here, if the forward voltage of each diode D1-D4 is 0.6V, for example, the clamp voltage Vc will be 4.7V.

Consequently, in this lighting system 10, output voltage from the hub dynamo 40 is always within 4.7 V, which never increases beyond the clamp voltage Vc.

The position lamp 52 is connected in parallel to the primary lighting circuit 51. The position lamp 52 includes a resistor (resistance) R2 configured and arranged to adjust voltage and the current. The resistor (resistance) R2 is electrically connected between the positive terminal in the rectifying circuit 50 and the second light emitting diode LED2. The second light emitting diode LED2 is also electrically connected between the resistor (resistance) R2 and the rectifying circuit 50. The forward voltage of the second light emitting diode LED2 is lower than the forward voltage (3.5 V, for example) of the first light emitting diode LED1, approximately 2 V, for example. The second light emitting diode LED2 is a relatively powerful LED for radiating white light output at approximately 0.01-1.0 W, for example. Resistor (resistance) R2 is a larger resistance value than resistor (resistance) R1, so clamp voltage is not lowered by the second semiconductor diode LED2 by arranging the forward voltage to be approximately 2 V.

Figure 3:
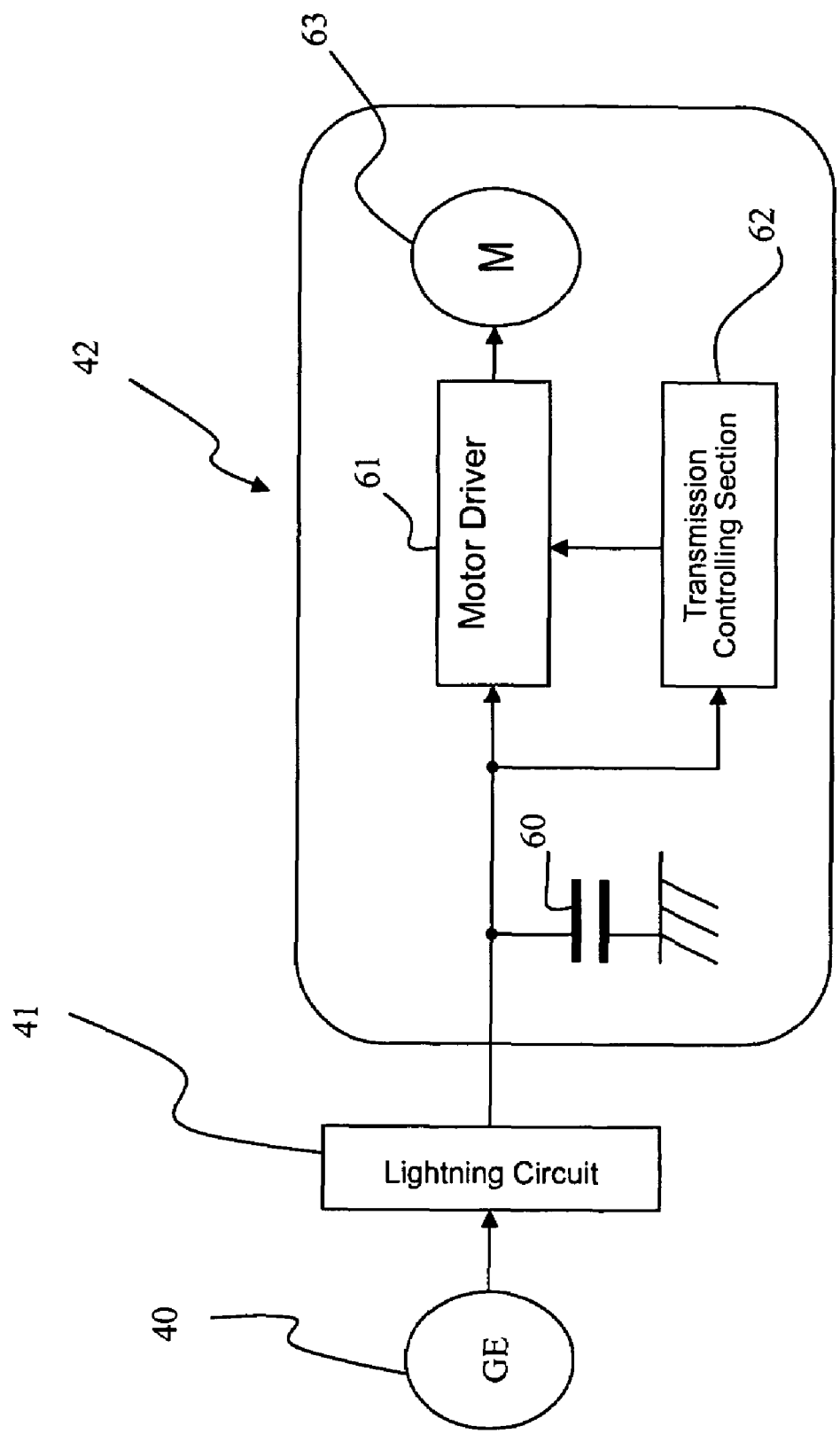
FIG. 3 is a block diagram illustrating the configuration of the electric transmission component of the bicycle lighting system illustrated in FIG. 1.

The electric transmission component 42, as illustrated in FIG. 3, includes a storage element 60, a motor driver 61, a transmission control section 62 and a transmission motor 63. The storage element 60 includes a large-capacity capacitor (condenser) such as an electric bi-layer capacitor, for example, to control voltage fluctuation when the bicycle is stopped. The motor driver 61 is operated by electricity from the storage element 60. The transmission control section 62 is arranged and configured to control the motor driver 61. The transmission motor 63 is operated by the motor driver 61 to actuate an electric transmission device (not shown). The transmission control section 62 outputs a motor drive signal to the motor driver 61 with a transmission signal from a transmission switch provided on the handlebars of the bicycle, for example. In such an electric transmission system, conventionally, a voltage-controlling circuit such as a regulator is provided to maintain voltage on the input side of the apparatus. However, with the present embodiment, the first light emitting diode LED1, which always receives electricity outputted from the rectifying circuit 50, or the rectifying circuit 50 clamps output voltage from the hub dynamo 40, thereby controlling it within the clamp voltage Vc, and consequently, such a voltage-controlling circuit is not needed in the electric transmission component 42. In this case, the electric transmission component 42 is preferably an electric transmission operating/control component configured and arranged to operate an electric transmission device of an electric transmission system.

As illustrated in FIGS. 1 and 2, the tail lamp 43 includes a tail lamp case 43a, a resistor (resistance) R3 and a third light emitting diode LED3. The tail lamp case 43a is configured and arranged to be secured to the rear section of the bicycle. The resistor (resistance) R3 is arranged and configured to adjust voltage and current. The resistor (resistance) R3 is connected to the positive terminal of the rectifying circuit 50 and the anode of the third light emitting diode LED3. The resistor (resistance) R3 and the third light emitting diode LED3 are preferably housed in the tail lamp case 43a. The third light emitting diode LED3 is a relatively powerful LED for radiating red light output at approximately 0.01-1.0 W, for example. The forward voltage of the third light emitting diode LED3 is also approximately 2 V (like the second light emitting diode LED2) and lower than the first light emitting diode LED1.

In a lighting system 10 configured in this manner, if a current with an electric potential flows from the rectifying circuit 50 in excess of the forward voltage (2 V, for example) of the second and third light emitting diodes LED2 and LED3, the position lamp 52 and tail lamp 43 will light up. However, the current does not flow into the first light emitting diode LED1 in the lighting circuit 41 unless the forward voltage of the first light emitting diode LED1 is exceeded, so the first light emitting diode LED1 does not light up. In other words, if a current with an electric potential in excess of the forward voltage of the first light emitting diode LED1 flows from the rectifying circuit 50, the first light emitting diode LED1 lights up as a headlamp in the primary lighting circuit 51 of lighting circuit 41. If the current flows into the first light emitting diode LED1, the current flows in lighting circuit 4 1, so output voltage from the hub dynamo 40 is clamped to the clamp voltage Vc while the first light emitting diode LED1 is on, because the primary lighting circuit 51 includes a first light emitting diode LED1 that always receives electricity outputted from the rectifying circuit 50. Consequently, the output voltage from the hub dynamo 40 does not increase beyond the clamp voltage Vc at high speeds, so excessive voltage is not applied to the position lamp 52, the electric transmission component 42, or the tail lamp 43.

Here, because voltage in the overall lighting system 10 is clamped to the first light emitting diode LED1 for lighting, it is not necessary to provide a voltage-controlling circuit for each electrically operated component. Consequently, in the bicycle lighting system 10, the apparatus for controlling voltage can be simplified.

Other Embodiments (a) In the previous embodiment, the light emitting diode is used for the position lamp 52 or tail lamp 43 as electrically operated components, but an ordinary light bulb can be used.

(b) In the previous embodiment, the position lamp 52, the electric transmission component 42, and the tail lamp 43 are illustrated as electrically operated components. However, the term "electrically operated components" includes any/all electrical devices operated with electricity from the dynamo, preferably electrically coupled in parallel with the primary lighting circuit 51 to the hub dynamo 40 via the rectifying circuit 50.

GENERAL INTERPRETATION OF TERMS

In understanding the scope of the present invention, the term "configured" as used herein to describe a component, section or part of a device includes hardware and/or software that is constructed and/or programmed to carry out the desired function. In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention as used in the normal riding position. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle lighting system comprising:
    a rectifying circuit configured and arranged to rectify electricity generated by a bicycle dynamo;
    a primary lighting circuit electrically coupled to the rectifying circuit, the primary lighting circuit having at least one first light emitting diode electrically coupled to the rectifying circuit without any switches disposed therebetween so that the first light emitting diode always receives electricity when electricity is outputted from the rectifying circuit and is always illuminated when electricity is outputted from the rectifying circuit; and
    an electrically operated component connected in parallel with the primary lighting circuit to the rectifying circuit to be operated by electricity from the rectifying circuit.

2. The bicycle lighting system according to claim 1, wherein
    the electrically operated component is a supplementary lighting circuit including a second light emitting diode that has a forward voltage that is lower than a forward voltage of the first light emitting diode.

3. The bicycle lighting system according to claim 2, further comprising
    an electric transmission component connected to the rectifying circuit to be operated by electricity from the rectifying circuit.

4. The bicycle lighting system according to claim 3, wherein
    the electric transmission component includes a storage element configured and arranged to store electricity.

5. The bicycle lighting system according to claim 4, further comprising
    a tail lamp configured to be attached to a rear section of a bicycle, the tail lamp including a third light emitting diode with a forward voltage that is lower than a forward voltage of the first light emitting diode.

6. The bicycle lighting system according to claim 1, wherein
    the electrically operated component is an electric transmission component.

7. The bicycle lighting system according to claim 6, wherein
    the electric transmission component includes a storage element configured and arranged to store electricity.

8. The bicycle lighting system according to claim 1, wherein
    the electrically operated component is a tail lamp configured to be attached to a rear section of a bicycle, the tail lamp including a third light emitting diode with a forward voltage that is lower than a forward voltage of the first light emitting diode.

9. The bicycle lighting system according to claim 2, further comprising
    a tail lamp configured to be attached to a rear section of a bicycle, the tail lamp including a third light emitting diode with a forward voltage that is lower than a forward voltage of the first light emitting diode.

10. The bicycle lighting system according to claim 3, further comprising
    a tail lamp configured to be attached to a rear section of a bicycle, the tail lamp including a third light emitting diode with a forward voltage that is lower than a forward voltage of the first light emitting diode.

11. The bicycle lighting system according to claim 3, wherein
    the electric transmission component is connected in parallel with the primary lighting circuit and the supplementary lighting circuit to the rectifying circuit to be operated by electricity from the rectifying circuit.

12. The bicycle lighting system according to claim 5, wherein
    the tail lamp is connected in parallel with the primary lighting circuit, the supplementary lighting circuit and the electric transmission component to the rectifying circuit to be operated by electricity from the rectifying circuit.

13. The bicycle lighting system according to claim 9, wherein
    the tail lamp is connected in parallel with the primary lighting circuit and the supplementary lighting circuit to the rectifying circuit to be operated by electricity from the rectifying circuit.

14. The bicycle lighting system according to claim 10, wherein
    the tail lamp is connected in parallel with the primary lighting circuit, the supplementary lighting circuit and the electric transmission component to the rectifying circuit to be operated by electricity from the rectifying circuit.

* * * * *